(12) United States Patent
Kobayashi et al.

(10) Patent No.: US 9,074,593 B2
(45) Date of Patent: Jul. 7, 2015

(54) PULSATION DAMPER

(71) Applicant: DENSO CORPORATION, Kariya, Aichi-pref. (JP)

(72) Inventors: Masayuki Kobayashi, Kasugai (JP); Eiji Ito, Anjo (JP); Yoshitomo Oguma, Hekinan (JP); Yuusuke Andou, Chiryu (JP)

(73) Assignee: DENSO CORPORATION, Kariya (JP)

( * ) Notice: Subject to any disclaimer, the term of this patent is extended or adjusted under 35 U.S.C. 154(b) by 256 days.

(21) Appl. No.: 13/767,255

(22) Filed: Feb. 14, 2013

(65) Prior Publication Data

US 2013/0230417 A1 Sep. 5, 2013

(30) Foreign Application Priority Data

Mar. 5, 2012 (JP) .................................. 2012-47732
Oct. 5, 2012 (JP) ................................. 2012-222893

(51) Int. Cl.
*F16L 55/04* (2006.01)
*F04B 43/02* (2006.01)
*F04B 11/00* (2006.01)
*F04B 53/00* (2006.01)

(52) U.S. Cl.
CPC ............. *F04B 43/02* (2013.01); *F04B 11/0008* (2013.01); *F04B 53/001* (2013.01)

(58) Field of Classification Search
CPC ........ F04B 37/12; F04B 53/16; F04B 53/004; F16L 55/04; F16L 55/0338
USPC ............... 138/26, 30; 137/207; 417/540, 542; 220/720, 724
See application file for complete search history.

(56) References Cited

U.S. PATENT DOCUMENTS

| | | | |
|---|---|---|---|
| 6,672,337 B2 * | 1/2004 | Kobayashi et al. | 138/30 |
| 6,948,479 B1 * | 9/2005 | Raney et al. | 123/456 |
| 7,874,317 B1 * | 1/2011 | Kulikov et al. | 138/30 |
| 8,757,212 B2 * | 6/2014 | Bartsch et al. | 138/30 |
| 2002/0153209 A1 * | 10/2002 | Nagy et al. | 188/73.37 |
| 2008/0289713 A1 * | 11/2008 | Munakata et al. | 138/26 |
| 2009/0185922 A1 | 7/2009 | Inoue et al. | |

OTHER PUBLICATIONS

WO 2009/103709 A1 Bartsch, et al., Aug. 27, 2009.*

* cited by examiner

*Primary Examiner* — Patrick F Brinson
(74) *Attorney, Agent, or Firm* — Nixon & Vanderhye PC

(57) ABSTRACT

A high-pressure pump has an elastic member arranged in a damper chamber between a first diaphragm and a second diaphragm. The elastic member is always in contact with both diaphragms while the high-pressure pump is operated. When the diaphragms are further vibrated due to a resonance under a situation where a frequency of the pressure pulsation of low-pressure fuel is in agreement with the characteristic frequency of the diaphragms, the elastic member restricts the deformation of the diaphragms. Therefore, the resonance of the first diaphragm and the second diaphragm can be restricted.

11 Claims, 13 Drawing Sheets

PULSATION DAMPER

CROSS-REFERENCE TO RELATED APPLICATION

This application is based on Japanese Patent Applications No. 2012-47732 filed on Mar. 5, 2012, and No. 2012-222893 filed on Oct. 5, 2012, the disclosures of which are incorporated herein by reference.

TECHNICAL FIELD

The present disclosure relates to a high-pressure pump.

BACKGROUND

A high-pressure pump has a plunger which reciprocates to pressurize fuel in a pressurization chamber. The pressurized fuel is discharged from the pressurization chamber. Japanese patent No. 4530053 (US-2009/0185922A1) discloses a high-pressure pump which has a pulsation damper in a fuel chamber. The pulsation damper is comprised of two diaphragms. The diaphragms are deformed according to a pressure of the fuel in the fuel chamber, so that a pressure pulsation of low-pressure fuel in a fuel supply system is reduced. The fuel supply system includes the fuel chamber and a fuel supply pipe communicating with the fuel chamber.

When a frequency of the pressure pulsation of the low-pressure fuel agrees with a characteristic frequency of the diaphragms, vibration amplitude of the diaphragms becomes large. That is, a resonance occurs. The resonance deteriorates a pulsation-reduction function of the pulsation damper. In the above high-pressure pump, a characteristic frequency of one diaphragm is made different from a characteristic frequency of another diaphragm in order to avoid that both diaphragms resonate simultaneously.

However, the resonance of the diaphragms itself can not be restricted. Therefore, when one of the diaphragms resonates, the pressure pulsation of the fuel in the fuel chamber cannot be reduced. The pressure pulsation may generate a noise in the fuel supply passage.

Moreover, since the plunger of the high-pressure pump is driven by a crankshaft of an engine, the pressure pulsation frequency of the low-pressure fuel depends on an engine speed. Therefore, the frequency of the pressure pulsation at which the resonance occurs varies according to an engine specification and specifications of the fuel supply pipes of the high-pressure pump. The characteristic frequency of each diaphragm is required to be adjusted according to a vehicle to which the high-pressure pump is provided.

SUMMARY

It is an object of the present disclosure to provide a high-pressure pump which is capable of restricting a resonance of a diaphragm.

A high-pressure pump feeding a fuel has an elastic member which is arranged in the damper chamber between the first diaphragm and the second diaphragm. The elastic member is always in contact with the first diaphragm and the second diaphragm while the high-pressure pump is operated.

When the diaphragms are further vibrated due to a resonance under a situation where a frequency of the pressure pulsation of low-pressure fuel is not in agreement with the characteristic frequency of the diaphragms, the elastic member does not disturb any deformation of the first diaphragm and the second diaphragm. When the diaphragms are further vibrated due to a resonance under a situation where a frequency of the pressure pulsation of low-pressure fuel is in agreement with the characteristic frequency of the diaphragms, the elastic member restricts the deformation of the diaphragms.

The elastic member functions as a resonance-restriction portion which restricts the resonance of the first diaphragm and the second diaphragm. Moreover, it is unnecessary to adjust the characteristic frequency of the first diaphragm and the second diaphragm according to a specification of an engine and a fuel pipe.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
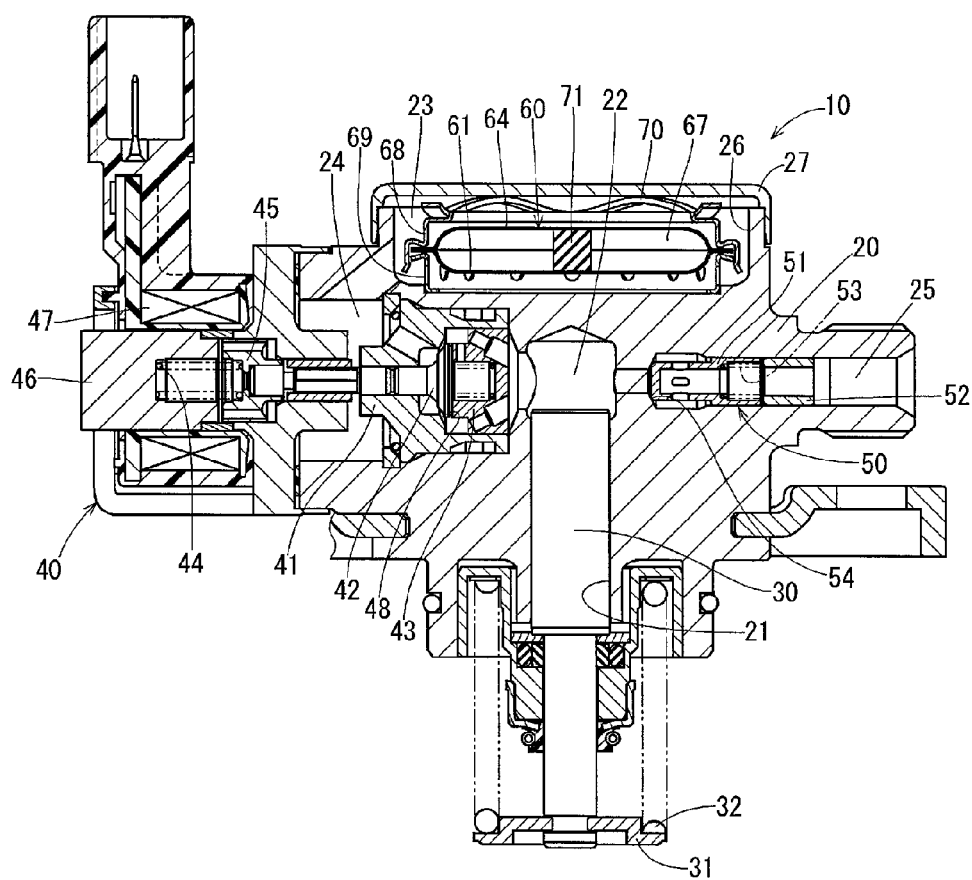
FIG. 1 is a sectional view of a high pressure pump according to a first embodiment of the present invention.

Multiple embodiments of the present invention will be described with reference to accompanying drawings. In each embodiment, the substantially same parts and the components as each embodiment are indicated with the same reference numeral and the same description will not be reiterated.

First Embodiment

FIG. 1 shows a high-pressure pump according to a first embodiment. The high-pressure pump 10 is a fuel pump which supplies fuel to an injector of a diesel engine or a gasoline engine.

Referring to FIG. 1, a structure of the high-pressure pump 10 will be described. The high-pressure pump 10 is provided with a housing 20, a plunger 30, a suction valve 40, a discharge valve 50, and a pulsation damper 60. In the following description, the upper side of FIG. 1 will be taken as "up", "upward" or "upper," and the low side of the FIG. 1 will be taken as "down", "downward" or "lower."

The housing 20 has an engaging hole 21 in which the plunger 30 reciprocatably slides. A pressurization chamber 22 is defined between a bottom of the engaging hole 21 and an upper surface of the plunger 30. A volumetric capacity of the pressurization chamber 22 changes by reciprocation of the plunger 30.

Moreover, the housing 20 has a fuel chamber 23 into which the fuel flows, a suction passage 24 which connects the fuel chamber 23 and the pressurization chamber 22, and a discharge passage 25 through which the fuel in the pressurization chamber 22 is discharged. The fuel chamber 23 is defined between an inner wall of a concave portion 26 and a cover 27 which covers the concave portion 26.

The plunger 30 is accommodated in the engaging hole 21 in such a manner as to reciprocate in its axial direction. A lower end of the plunger 30 protrudes from the housing 20. The plunger 30 is biased downward by a spring 32 through a spring seat 31.

The lower end surface of the plunger 30 is in contact with a tappet (not shown). When the plunger 30 is pushed upward by the tappet, the volume of the pressurization chamber 22 becomes smaller. When the plunger is moved downward by the spring 32, the volume of the pressurization chamber 22 becomes larger.

The suction valve 40 is an electromagnetic valve which opens and closes the suction passage 24. The suction valve 40 is comprised of a suction valve body 41, a suction valve member 42, a stopper 43, a spring 44, a movable core 45, a fixed core 46 and a coil 47. When the coil 47 is energized, the movable core 45 is attracted toward the fixed core 46, so that the suction valve member 42 sits on a seat 48 of the suction valve body 41. When the coil 47 is deenergized, the suction valve member 42 moves away from the seat 48. When the suction valve member 42 sits on the seat 48, the suction passage 24 is closed. When the suction valve member 42 moves away from the seat 48, the suction passage 24 is opened.

The discharge valve 50 opens and closes the discharge passage 25. The discharge valve 50 is comprised of a discharge valve member 51, a stopper 52 and a spring 53. When the fuel pressure in the pressurization chamber 22 becomes greater than or equal to a specified value, the discharge valve member 51 moves away from a seat 54. When the fuel pressure in the pressurization chamber 22 becomes lower than the specified value, the spring 53 biases the discharge valve member 51 to the seat 54. When the discharge valve member 51 moves away from the seat 54, the discharge passage 25 is opened. When the discharge valve member 51 sits on the seat 54, the discharge passage 25 is closed.

A pulsation damper 60 is arranged in the fuel chamber 23 and is comprised of a first diaphragm 61 and a second diaphragm 64. The first and the second diaphragm 61, 64 are formed like a dish and are joined together at an outer periphery thereof. The pulsation damper 60 defines a damper chamber 67 therein. Inert gas of predetermined pressure is enclosed in the damper chamber 67. In the fuel chamber 23, a space accommodating the fuel is referred to as "fuel accommodation space", hereinafter.

The pulsation damper 60 is supported by a first supporting member 68 and a second supporting member 69 at its outer periphery. A damper assembly comprised of the pulsation damper 60, the first support member 68 and the second support member 69 is fixed on an inner wall surface of the fuel chamber 23 by a wave-shaped washer 70.

The first diaphragm 61 and the second diaphragm 64 are elastically deformed according to a pressure variation in the fuel chamber 23. For example, when the fuel pressure in the fuel chamber 23 becomes larger than the pressure of the inert gas in the damper chamber 67, the first diaphragm 61 is concaved upward and the second diaphragm 64 is concaved downward. As above, when the volume of the damper chamber 67 becomes smaller, the volume of the fuel accommodation space in the fuel chamber 23 becomes larger. Thus, it is restricted that the fuel pressure in the fuel chamber 23 increases.

Also, when the fuel pressure in the fuel chamber 23 becomes smaller than the pressure of the inert gas in the damper chamber 67, the first diaphragm 61 is convexed downward and the second diaphragm 64 is convexed upward. When the volume of the damper chamber 67 becomes larger, the volume of the fuel accommodation space in the fuel chamber 23 becomes smaller. Thus, it is restricted that the fuel pressure in the fuel chamber 23 decreases.

The high-pressure pump 10 performs following strokes (1) to (3) to discharge the pressurized fuel.

(1) Suction Stroke

When the plunger 30 slides down from the top dead center toward the bottom dead center, the suction valve 40 is opened and the discharge valve 50 is closed. Thus, the fuel in the fuel chamber 23 is suctioned into the pressurization chamber 22 through a suction passage 24. The pressure pulsation of the fuel supplied to the fuel chamber 23 from a fuel pump is reduced by the pulsation damper 60.

(2) Metering Stroke

When the plunger 30 slides up from the bottom dead center toward the top dead center, the coil 47 is not energized and the suction valve 40 is opened for a specified time period. Thus, the fuel in the pressurization chamber 22 is returned to the fuel chamber 23 through the suction passage 24. Also, the fuel pressure pulsation of the fuel returned to the fuel chamber 23 is reduced by the pulsation damper 60.

When the coil 47 is energized in the period in which the plunger 30 moves upward, the suction valve 40 is closed and the metering stroke ends. By adjusting the timing at which the coil 47 starts to be energized, the fuel quantity returned from the pressurization chamber 22 to the fuel chamber 23 is adjusted. As a result, the quantity of fuel pressurized in the pressurization chamber 22 is determined.

(3) Pressurization Stroke

When the plunger 13 further slides up toward the top dead center with an interruption between the pressurization chamber 22 and the fuel chamber 23, the fuel pressure in the pressurization chamber 22 further increases. Then, when the fuel pressure in the pressurization chamber 22 becomes greater than a specified value, the discharge valve 50 is opened. Thus, the high-pressure fuel in the pressurization chamber 22 is discharged through the discharge passage 25.

Figure 2:
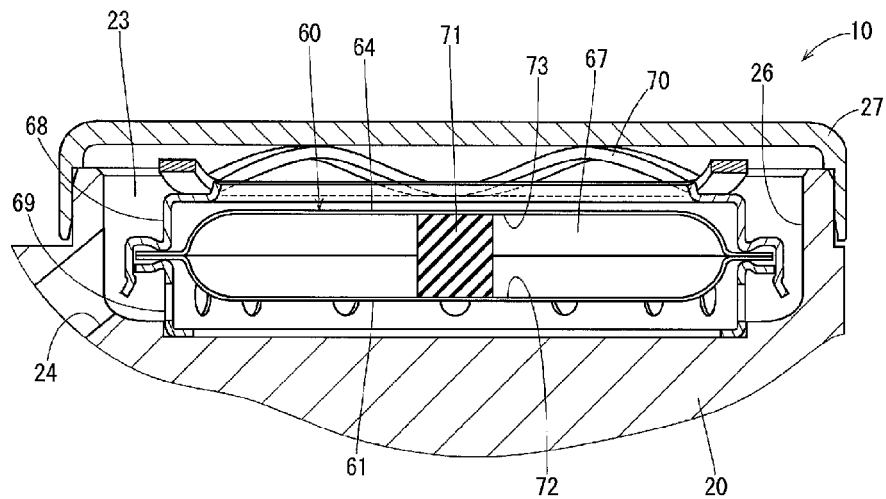
FIG. 2 is an enlarged view of a pulsation damper shown in FIG. 1.

Referring to FIGS. 1 and 2, a configuration of the high-pressure pump 10 will be described in detail. The high-pressure pump 10 is provided with an elastic member 71 in the damper chamber 67 of the pulsation damper 60. The elastic member 71 is made of synthetic rubber and is arranged between center portions of the first diaphragm 61 and the second diaphragm 64. The center portions of the first diaphragm 61 and the second diaphragm 64 have the largest deformation, when the first diaphragm 61 and the second diaphragm 64 are deformed according to the fuel pressure in the fuel chamber 23.

The elastic member 71 is in contact with an inner surface 72 of the first diaphragm 61 and an inner surface 73 of the second diaphragm 64 while the high-pressure pump 10 is operated so that the fuel is supplied to the fuel chamber 23 from the fuel pump and the fuel feed pressure is applied to the pulsation damper 60.

While the high-pressure pump 10 is operated, the elastic member 71 is always sandwiched between the first diaphragm 61 and the second diaphragm 64. The elastic member 71 is deformable in such a manner as to be always in contact with the inner surface 72 of the first diaphragm 61 and the inner surface 73 of the second diaphragm.

Next, an operation of the pulsation damper 60 having the elastic member 71 will be described, hereinafter. When the first diaphragm 61 and the second diaphragm 64 are deformed under a situation where the frequency of the pressure pulsation of low-pressure fuel is not in agreement with the characteristic frequency of the first diaphragm 61 and the second diaphragm 64, the elastic member 71 does not disturb any deformation of the first diaphragm 61 and the second diaphragm 64.

Meanwhile, when the first diaphragm 61 and the second diaphragm 64 are further vibrated due to the resonance under a situation where the frequency of the pressure pulsation of low-pressure fuel is in agreement with the characteristic frequency of the first diaphragm 61 and the second diaphragm 64, the elastic member 71 restricts the deformation of the first diaphragm 61 and the second diaphragm 64. The elastic member 71 functions as a resonance-restriction portion which restricts the resonance of the first diaphragm 61 and the second diaphragm 64.

According to the first embodiment as explained above, the high-pressure pump 10 is provided with the elastic member 71 which is arranged in the damper chamber 67 between the first diaphragm 61 and the second diaphragm 64. The elastic member 71 is always in contact with the first diaphragm 61 and the second diaphragm 64 while the high-pressure pump 10 is operated.

When the first diaphragm 61 and the second diaphragm 64 are further vibrated due to the resonance under a situation where the frequency of the pressure pulsation of low-pressure fuel is in agreement with the characteristic frequency of the first diaphragm 61 and the second diaphragm 64, the elastic member 71 restricts the deformation of the first diaphragm 61 and the second diaphragm 64.

Therefore, the resonance of the first diaphragm 61 and the second diaphragm 64 can be restricted. Moreover, it is unnecessary to adjust the characteristic frequency of the first diaphragm 61 and the second diaphragm 64 according to the specification of an engine and a fuel pipe, unlike the conventional high-pressure pump.

Since the elastic member 71 is arranged between center portions of the first diaphragm 61 and the second diaphragm 64, the resonance of the first diaphragm 61 and the second diaphragm 64 can be effectively restricted.

Moreover, according to the first embodiment, the elastic member 71 is easily deformed in such a manner as to be always in contact with the inner surface 72 of the first diaphragm 61 and the inner surface 73 of the second diaphragm.

Second Embodiment

Figure 3:
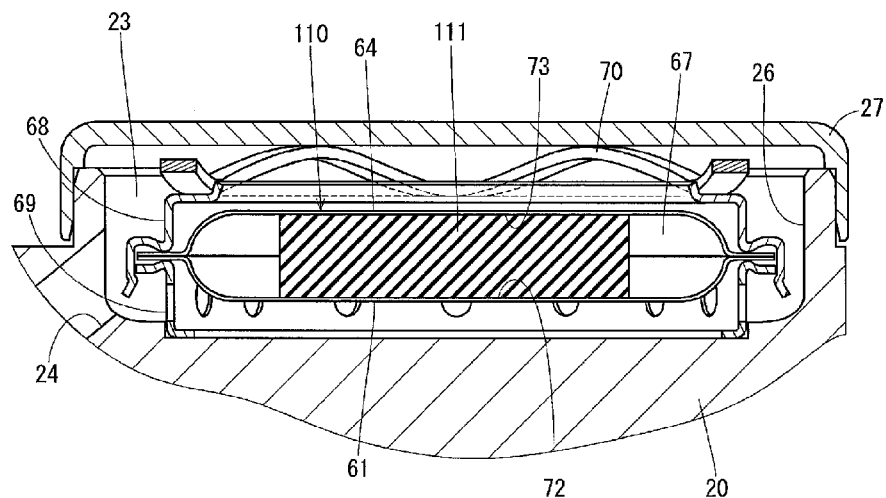
FIG. 3 is a cross-sectional view showing a pulsation damper of a high-pressure pump according to a second embodiment.

FIG. 3 is a cross-sectional view showing a pulsation damper of a high-pressure pump according to a second embodiment; an elastic member 111 of a pulsation damper 110 has a cross-sectional area larger than that of the elastic member 71 of the first embodiment. While the high-pressure pump 10 is operated, the elastic member 111 is always sandwiched between the first diaphragm 61 and the second diaphragm 64. According to the second embodiment, the resonance of the first diaphragm 61 and the second diaphragm 64 is further restricted.

Third Embodiment

Figure 4:
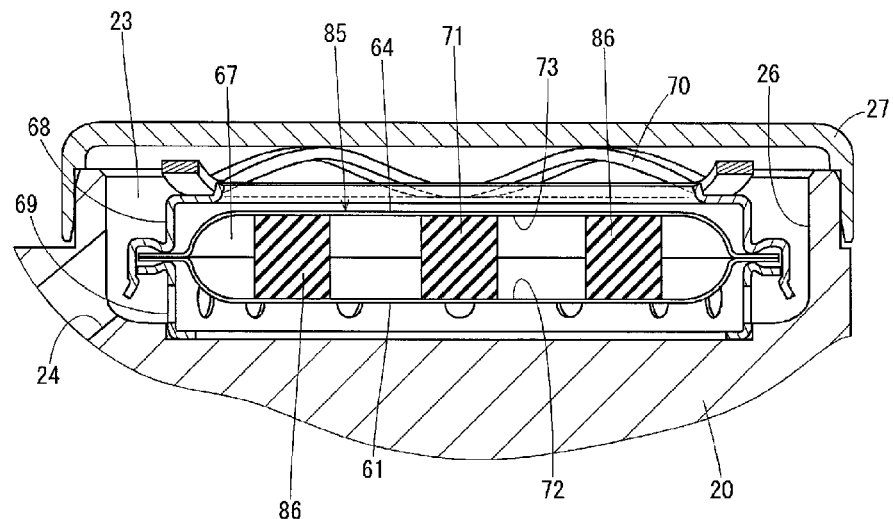
FIG. 4 is a cross-sectional view showing a pulsation damper of a high-pressure pump according to a third embodiment.

FIG. 4 is a cross-sectional view showing a pulsation damper of a high-pressure pump according to a third embodiment. A pulsation damper 85 has multiple elastic members 71, 86. The elastic members 86 are arranged at both sides of the elastic member 71. The elastic members 86 correspond to "second elastic member". According to the third embodiment, the resonance of the first diaphragm 61 and the second diaphragm 64 is further restricted.

Fourth Embodiment

Figure 5:
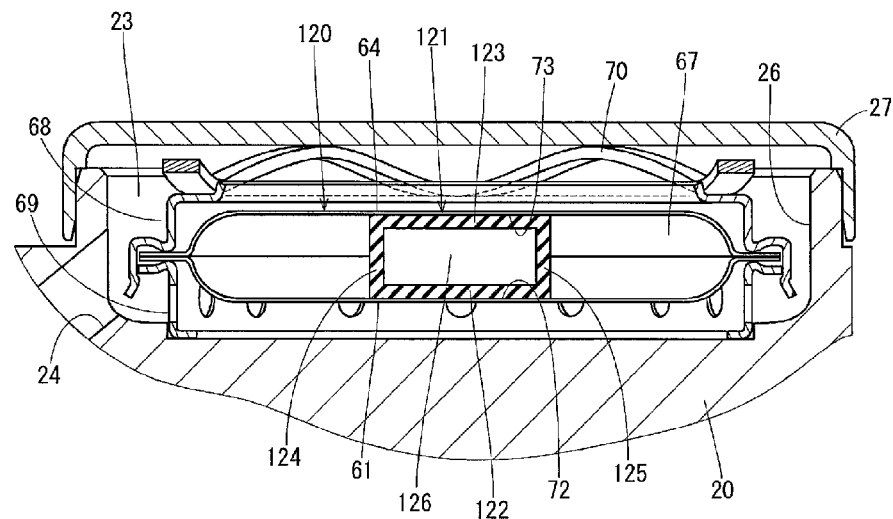
FIG. 5 is a cross-sectional view showing a pulsation damper of a high-pressure pump according to a fourth embodiment.

FIG. 5 is a cross-sectional view showing a pulsation damper of a high-pressure pump according to a fourth embodiment. A pulsation damper 120 has an elastic member 121 which is comprised of a first contact portion 122, a second contact portion 123 and connecting portions 124 and 125. The first contact portion 122 is in contact with the inner surface 72 of the first diaphragm 61. The second contact portion 123 is in contact with the inner surface 73 of the second diaphragm 64. The connecting portions 124 and 125 connect both ends of the first contact portion 122 and the second contact portion 123. The first contact portion 122, the second contact portion 123 and the connecting portions 124 and 125 are formed integrally.

The elastic member 121 has a hollow 126 which is defined by the first contact portion 122, the second contact portion 123 and the connecting portions 124 and 125. The hollow 126 decreases a rigidity of the elastic member 121 as a whole and functions as a rigidity-reducing portion. While the high-pressure pump 10 is operated, the elastic member 121 is always sandwiched between the first diaphragm 61 and the second diaphragm 64.

When the first diaphragm 61 and the second diaphragm 64 are deformed under a situation where the frequency of the pressure pulsation of low-pressure fuel is not in agreement with the characteristic frequency of the first diaphragm 61 and the second diaphragm 64, the elastic member 121 does not disturb any deformation of the first diaphragm 61 and the second diaphragm 64. Since the elastic member 121 has the hollow 126 as a rigidity-reducing portion, the first diaphragm 61 and the second diaphragm 64 are easily deformed under a situation where the frequency of the pressure pulsation of low-pressure fuel is not in agreement with the characteristic frequency of the first diaphragm 61 and the second diaphragm 64.

Fifth Embodiment

Figure 6:
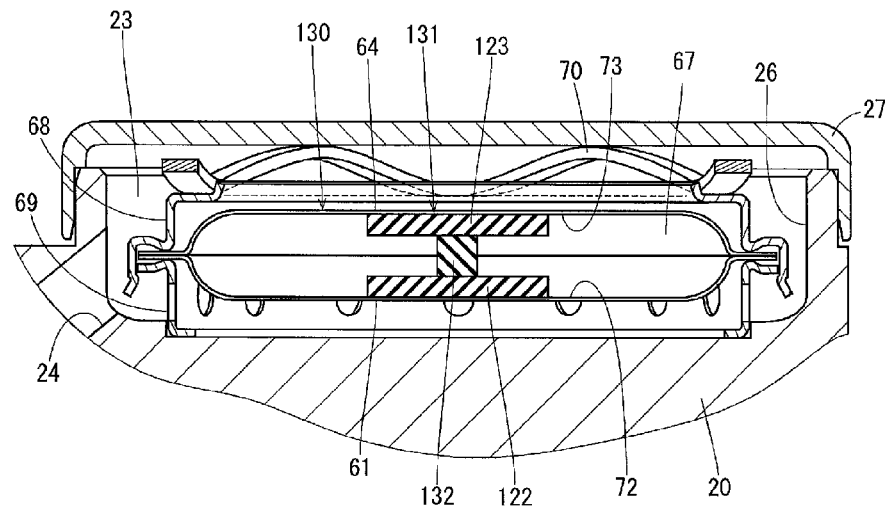
FIG. 6 is a cross-sectional view showing a pulsation damper of a high-pressure pump according to a fifth embodiment.

FIG. 6 is a cross-sectional view showing a pulsation damper of a high-pressure pump according to a fifth embodiment. A pulsation damper 130 has an elastic member 131 which is comprised of the first contact portion 122, the second contact portion 123 and a connecting portion 132. The connecting portion 132 is cylindrical and connects center portions of the first contact portion 122 and the second contact portion 123. While the high-pressure pump 10 is operated, the elastic member 131 is always sandwiched between the first diaphragm 61 and the second diaphragm 64.

The connecting portion 132 decreases a rigidity of the elastic member 131 as a whole and functions as a rigidity-reducing portion. The first diaphragm 61 and the second diaphragm 64 are easily deformed under a situation where the frequency of the pressure pulsation of low-pressure fuel is not in agreement with the characteristic frequency of the first diaphragm 61 and the second diaphragm 64.

Sixth Embodiment

Figure 7:
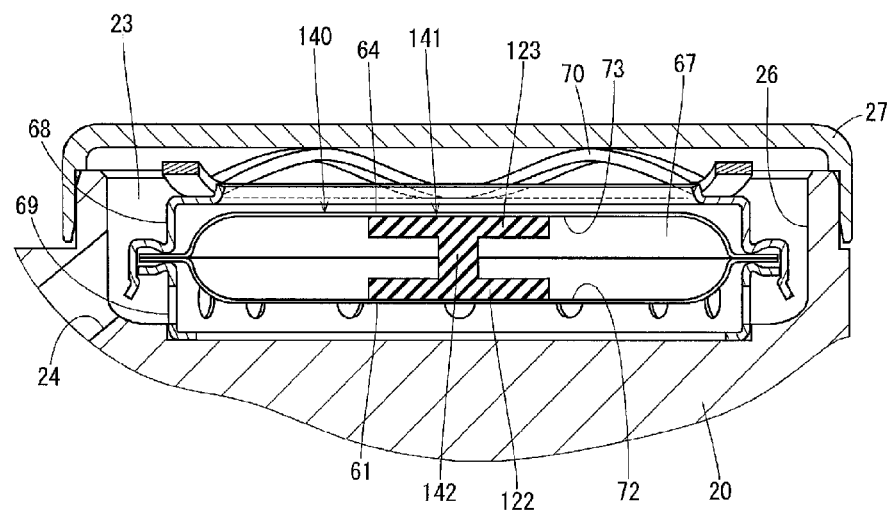
FIG. 7 is a cross-sectional view showing a pulsation damper of a high-pressure pump according to a sixth embodiment.

FIG. 7 is a cross-sectional view showing a pulsation damper of a high-pressure pump according to a sixth embodiment. A pulsation damper 140 has an elastic member 141 which is comprised of the first contact portion 122, the second contact portion 123 and a connecting portion 142. The first contact portion 122, the second contact portion 123 and the connecting portions 142 are formed integrally. The elastic member 141 can be easily disposed in the pulsation damper 140.

Seventh Embodiment

Figure 8:
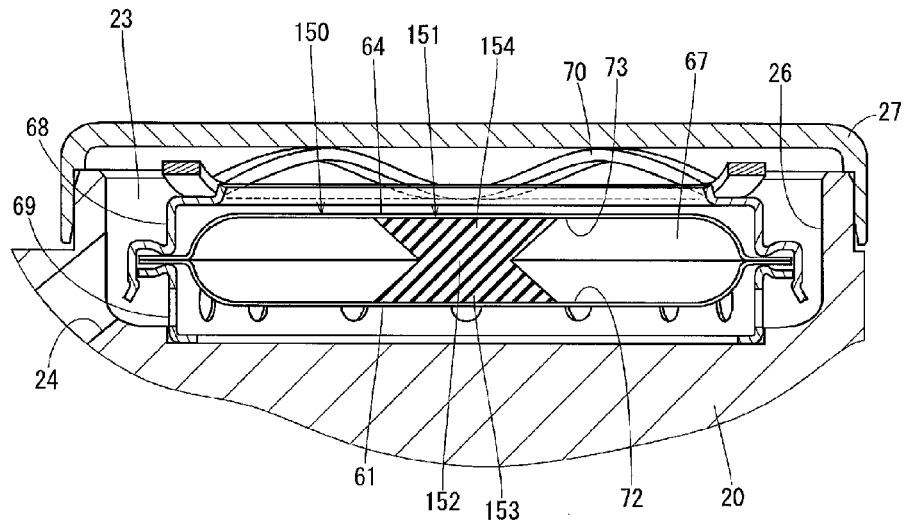
FIG. 8 is a cross-sectional view showing a pulsation damper of a high-pressure pump according to a seventh embodiment.

FIG. 8 is a cross-sectional view showing a pulsation damper of a high-pressure pump according to a seventh embodiment. A pulsation damper 150 has an elastic member 151 of which intermediate portion 152 is made narrower than end portions 153 and 154. The intermediate portion 152 decreases a rigidity of the elastic member 151 and functions as a rigidity-reducing portion. While the high-pressure pump 10 is operated, the elastic member 151 is always sandwiched between the first diaphragm 61 and the second diaphragm 64. The first diaphragm 61 and the second diaphragm 64 are easily deformed under a situation where the frequency of the pressure pulsation of low-pressure fuel is not in agreement with the characteristic frequency of the first diaphragm 61 and the second diaphragm 64.

Eighth Embodiment

Figure 9:
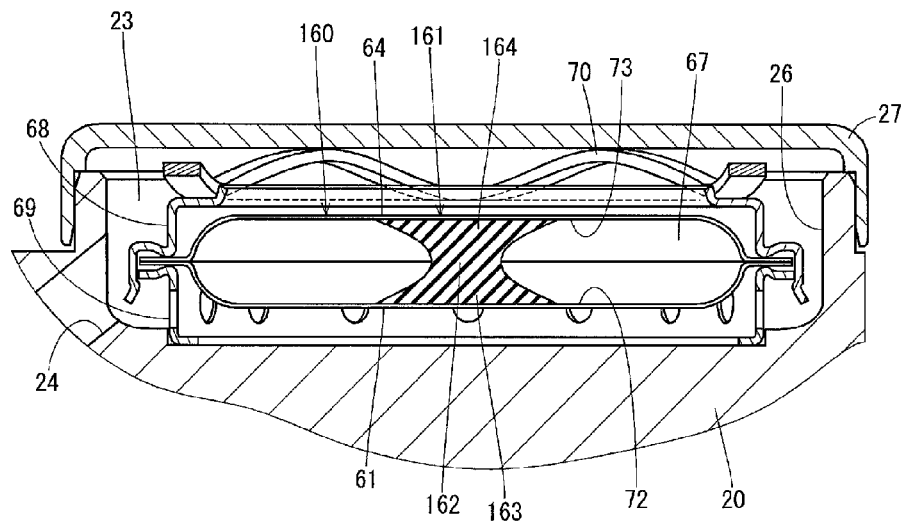
FIG. 9 is a cross-sectional view showing a pulsation damper of a high-pressure pump according to an eighth embodiment.

FIG. 9 is a cross-sectional view showing a pulsation damper of a high-pressure pump according to an eighth embodiment. A pulsation damper 160 has an elastic member 161 of which intermediate portion 162 is made narrower than end portions 163 and 164. An outer profile of the intermediate portion 162 is curved. The intermediate portion 162 decreases a rigidity of the elastic member 161 and functions as a rigidity-reducing portion. While the high-pressure pump 10 is operated, the elastic member 161 is always sandwiched between the first diaphragm 61 and the second diaphragm 64. The elastic member 161 can be easily formed.

Ninth Embodiment

Figure 10:
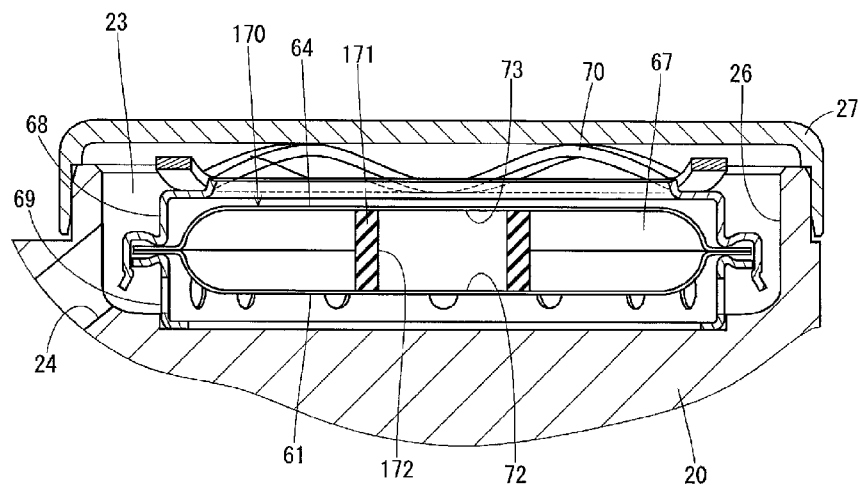
FIG. 10 is a cross-sectional view showing a pulsation damper of a high-pressure pump according to a ninth embodiment.

FIG. 10 is a cross-sectional view showing a pulsation damper of a high-pressure pump according to a ninth embodiment. A pulsation damper 170 has an elastic member 171 which has a through hole 172 extending in a deformation direction thereof. The through hole 172 functions as a rigidity-reducing portion which reduces the rigidity of the elastic member 171. While the high-pressure pump 10 is operated, the elastic member 171 is always sandwiched between the first diaphragm 61 and the second diaphragm 64. The first diaphragm 61 and the second diaphragm 64 are easily deformed under a situation where the frequency of the pressure pulsation of low-pressure fuel is not in agreement with the characteristic frequency of the first diaphragm 61 and the second diaphragm 64.

Tenth Embodiment

Figure 11:
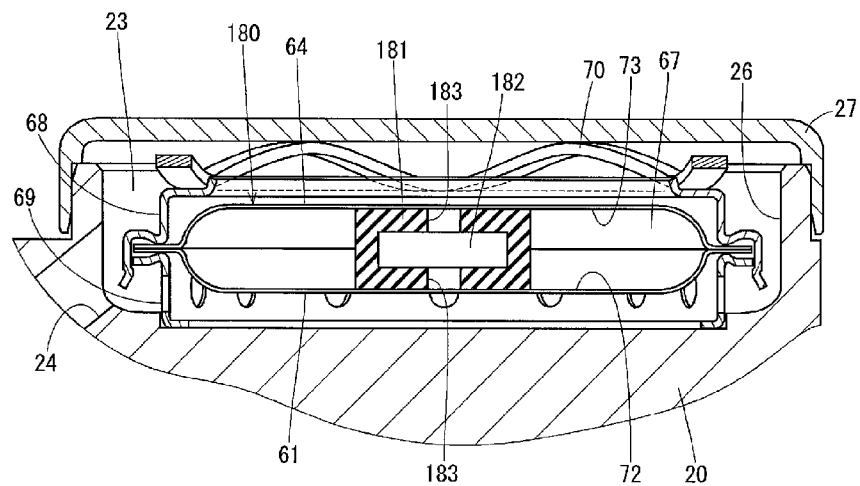
FIG. 11 is a cross-sectional view showing a pulsation damper of a high-pressure pump according to a tenth embodiment.

FIG. 11 is a cross-sectional view showing a pulsation damper of a high-pressure pump according to a tenth embodiment. A pulsation damper 180 has an elastic member 181 which has a hollow 182 and a through hole 183 extending in a deformation direction thereof. While the high-pressure pump 10 is operated, the elastic member 181 is always sandwiched between the first diaphragm 61 and the second diaphragm 64.

The resonance of the first diaphragm 61 and the second diaphragm 64 is further restricted.

Eleventh Embodiment

Figure 12:
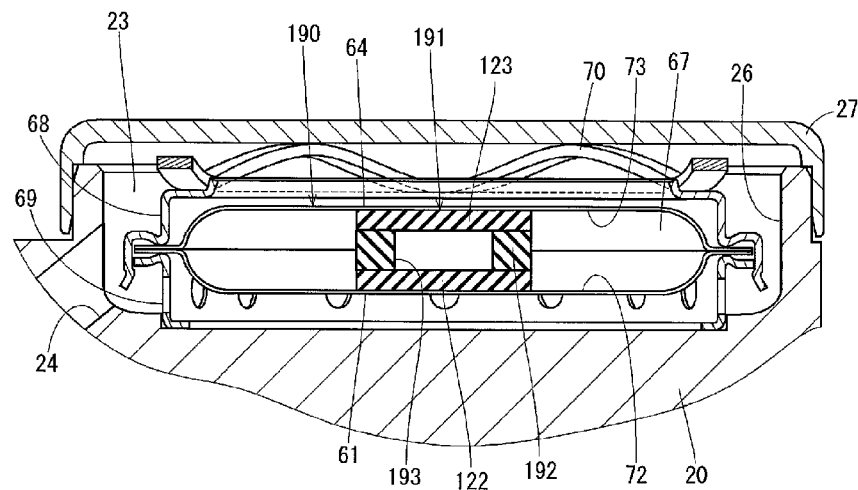
FIG. 12 is a cross-sectional view showing a pulsation damper of a high-pressure pump according to an eleventh embodiment.

FIG. 12 is a cross-sectional view showing a pulsation damper of a high-pressure pump according to an eleventh embodiment. A pulsation damper 190 has an elastic member 191 which is comprised of the first contact portion 122, the second contact portion 123 and a connecting portion 192. The connecting portion 192 is cylindrical and connects peripheral portions of the first contact portion 122 and the second contact portion 123. The first contact portion 122, the second contact portion 123 and the connecting portions 192 are sandwiched between the first diaphragm 61 and the second diaphragm 64. While the high-pressure pump 10 is operated, the elastic member 191 is always sandwiched between the first diaphragm 61 and the second diaphragm 64.

The connecting portion 192 decreases a rigidity of the elastic member 191 and functions as a rigidity-reducing portion. The first diaphragm 61 and the second diaphragm 64 are easily deformed under a situation where the frequency of the pressure pulsation of low-pressure fuel is not in agreement with the characteristic frequency of the first diaphragm 61 and the second diaphragm 64.

Twelfth Embodiment

Figure 13:
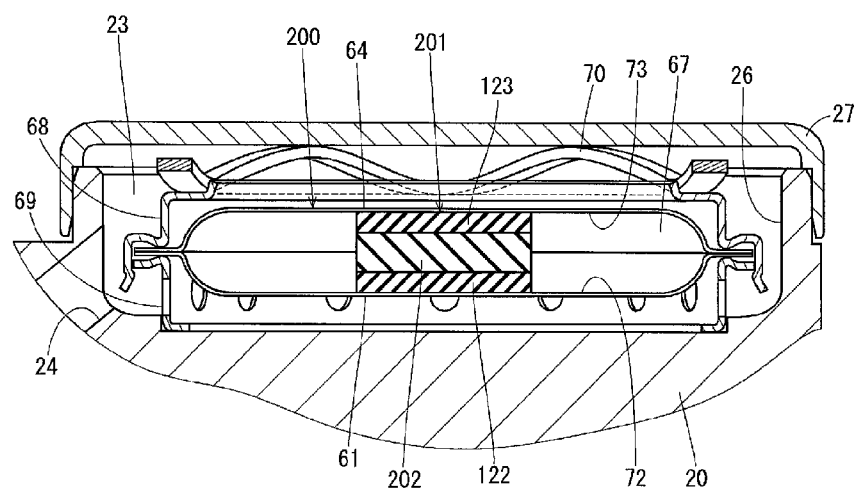
FIG. 13 is a cross-sectional view showing a pulsation damper of a high-pressure pump according to a twelfth embodiment.

FIG. 13 is a cross-sectional view showing a pulsation damper of a high-pressure pump according to a twelfth embodiment. A pulsation damper 200 has an elastic member 201 which is comprised of the first contact portion 122, the second contact portion 123 and a connecting portion 202. The connecting portion 202 connects the first contact portion 122 and the second contact portion 123. The connecting portion 202 is made of material which is softer than that of the first contact portion 122 and the second contact portion 123. The connecting portion 202 functions as a rigidity-reducing portion which reduces the rigidity of the elastic member 201. While the high-pressure pump 10 is operated, the elastic member 201 is always sandwiched between the first diaphragm 61 and the second diaphragm 64. The first diaphragm 61 and the second diaphragm 64 are easily deformed under a situation where the frequency of the pressure pulsation of low-pressure fuel is not in agreement with the characteristic frequency of the first diaphragm 61 and the second diaphragm 64.

Thirteenth Embodiment

Figure 14:
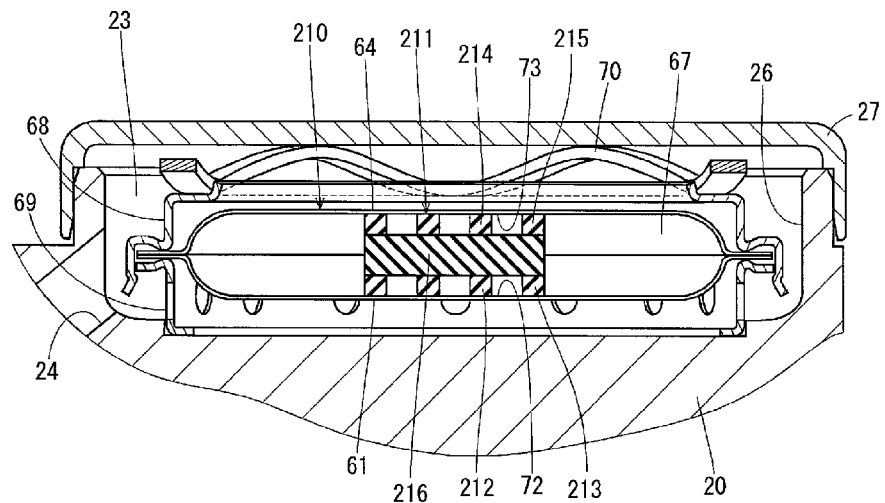
FIG. 14 is a cross-sectional view showing a pulsation damper of a high-pressure pump according to a thirteenth embodiment.

FIG. 14 is a cross-sectional view showing a pulsation damper of a high-pressure pump according to a thirteenth embodiment. A pulsation damper 210 has an elastic member 211 which is comprised of first contact portions 212, 213, second contact portions 214, 215 and a connecting portion 216. The first contact portions 212, 213 are annularly formed. Each of the first contact portions 212, 213 is coaxially disposed and is in contact with the inner surface 72 of the first diaphragm 61. Also, the second contact portions 214, 215 are annularly formed. Each of the second contact portions 214, 215 is coaxially disposed and is in contact with the inner surface 73 of the second diaphragm 64. The connecting portion 216 is arranged between the first contact portions 212, 213 and the second contact portions 214, 215. The first contact portions 212, 213, the second contact portions 214, 215 and the connecting portions 216 are formed independently and are sandwiched between the first diaphragm 61 and the second diaphragm 64. While the high-pressure pump 10 is operated, the elastic member 211 is always sandwiched between the first diaphragm 61 and the second diaphragm 64.

The first contact portions 212, 213 and the second contact portions 214, 215 decreases a rigidity of the elastic member 211 and functions as a rigidity-reducing portion. The first diaphragm 61 and the second diaphragm 64 are easily deformed under a situation where the frequency of the pressure pulsation of low-pressure fuel is not in agreement with the characteristic frequency of the first diaphragm 61 and the second diaphragm 64.

Fourteenth Embodiment

Figure 15:
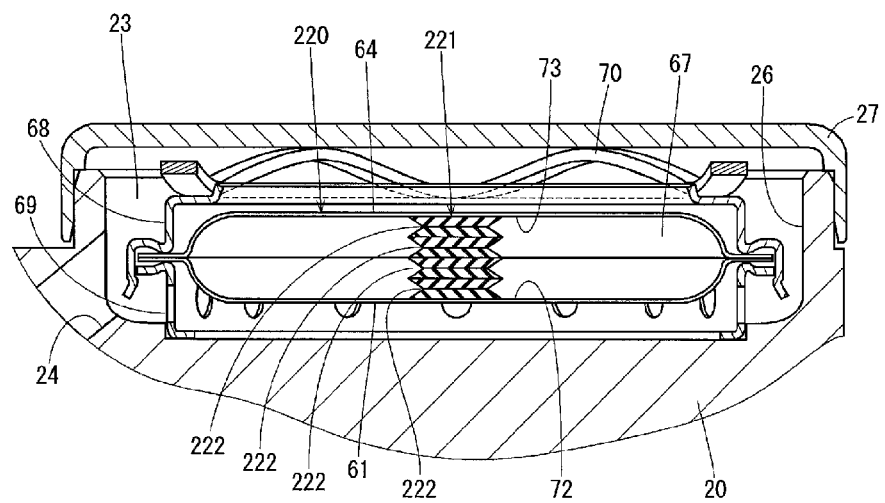
FIG. 15 is a cross-sectional view showing a pulsation damper of a high-pressure pump according to a fourteenth embodiment.

FIG. 15 is a cross-sectional view showing a pulsation damper of a high-pressure pump according to a fourteenth embodiment. A pulsation damper 220 has an elastic member 221 which is shaped like bellows. A plurality of concave portions 222 of the elastic member 221 functions as a rigidity-reducing portion which reduces the rigidity of the elastic member 221. While the high-pressure pump 10 is operated, the elastic member 221 is always sandwiched between the first diaphragm 61 and the second diaphragm 64. The first diaphragm 61 and the second diaphragm 64 are easily deformed under a situation where the frequency of the pressure pulsation of low-pressure fuel is not in agreement with the characteristic frequency of the first diaphragm 61 and the second diaphragm 64.

Fifteenth Embodiment

Figure 16:
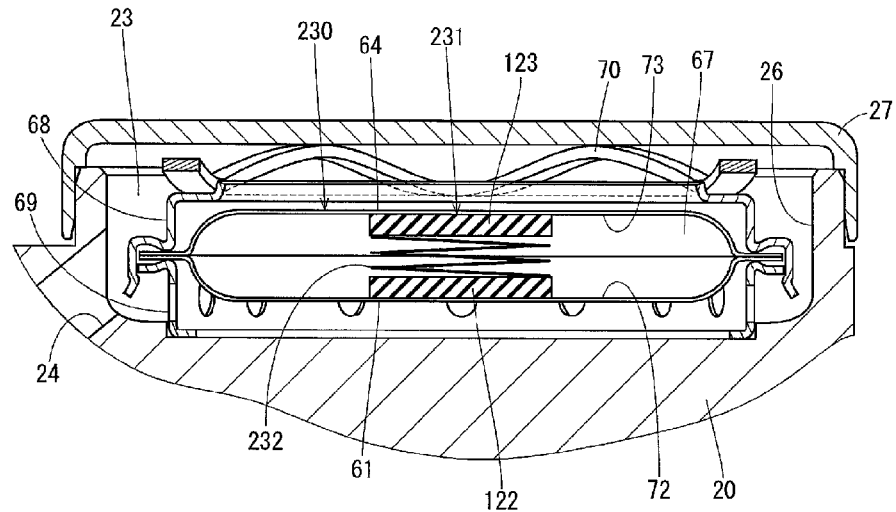
FIG. 16 is a cross-sectional view showing a pulsation damper of a high-pressure pump according to a fifteenth embodiment.

FIG. 16 is a cross-sectional view showing a pulsation damper of a high-pressure pump according to a fifteenth embodiment. A pulsation damper 230 has an elastic member 231 which is comprised of the first contact portion 122, the second contact portion 123 and a spring portion 232. The spring portion 232 is comprised of a coil spring which connects the first contact portion 122 and the second contact portion 123. The spring portion 232 functions as a rigidity-reducing portion which reduces the rigidity of the elastic member 231. While the high-pressure pump 10 is operated, the elastic member 231 is always sandwiched between the first diaphragm 61 and the second diaphragm 64. The first diaphragm 61 and the second diaphragm 64 are easily deformed under a situation where the frequency of the pressure pulsation of low-pressure fuel is not in agreement with the characteristic frequency of the first diaphragm 61 and the second diaphragm 64.

Sixteenth Embodiment

Figure 17:
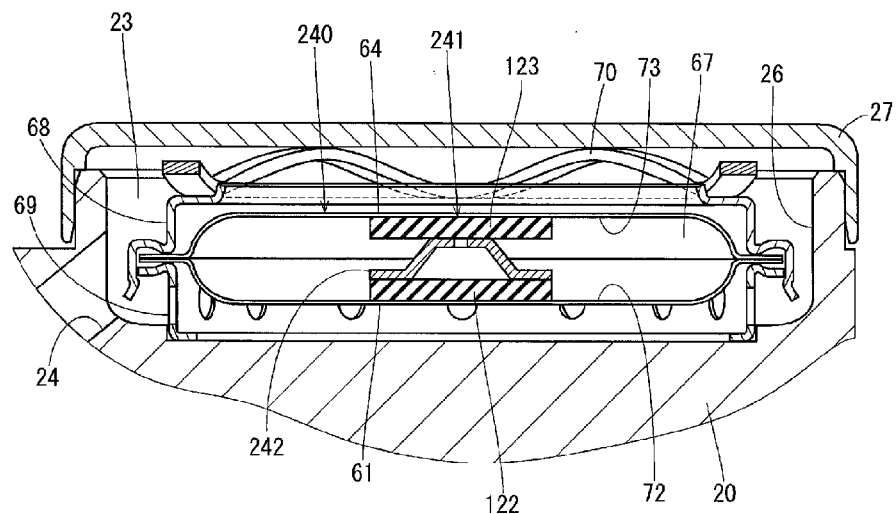
FIG. 17 is a cross-sectional view showing a pulsation damper of a high-pressure pump according to a sixteenth embodiment.

FIG. 17 is a cross-sectional view showing a pulsation damper of a high-pressure pump according to a sixteen embodiment. A pulsation damper 240 has an elastic member 241 which is comprised of the first contact portion 122, the second contact portion 123 and a spring portion 242. The spring portion 242 is comprised of a Belleville springs. Also in the sixteenth embodiment, the same advantages as those in the fifteenth embodiment can be obtained.

Seventeenth Embodiment

Figure 18:
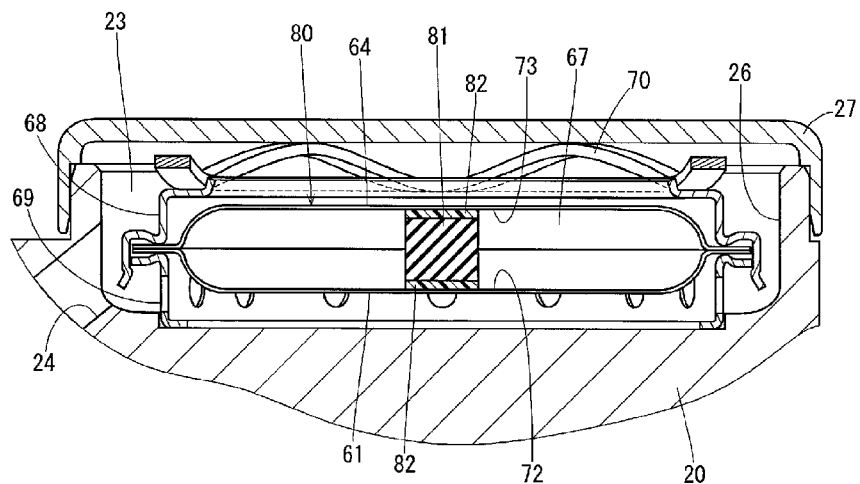
FIG. 18 is a cross-sectional view showing a pulsation damper of a high-pressure pump according to a seventeenth embodiment.

FIG. 18 is a cross-sectional view showing a pulsation damper of a high-pressure pump according to a seventeenth embodiment. An elastic member 81 of a pulsation damper 80 is bonded to the first diaphragm 61 and the second diaphragm 64 by a bonding layer 82. The elastic member 81 is elastically deformed according to the position of the first diaphragm 61 and the second diaphragm 64. Also in the seventeenth embodiment, the same advantages as those in the first embodiment can be obtained. The elastic member 81 can be easily attached to the first diaphragm 61 and the second diaphragm 64.

Eighteenth Embodiment

Figure 19:
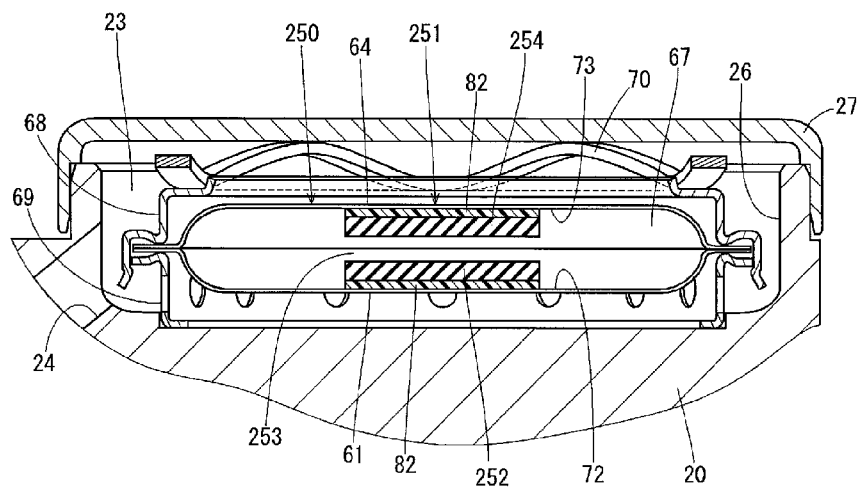
FIG. 19 is a cross-sectional view showing a pulsation damper of a high-pressure pump according to an eighteenth embodiment.

FIG. 19 is a cross-sectional view showing a pulsation damper of a high-pressure pump according to an eighteenth embodiment. An elastic member 251 of a pulsation damper 250 is comprised of a first contact portion 252 and a second contact portion 254. The first contact portion 252 is bonded to the first diaphragm 61 and the second contact portion 254 is bonded to the second diaphragm 64. A space 253 is defined between the first contact portion 252 and the second contact portion 254. The eighteenth embodiment has the same advantageous effect as the seventeenth embodiment. The first diaphragm 61 and the second diaphragm 64 are easily deformed under a situation where the frequency of the pressure pulsation of low-pressure fuel is not in agreement with the characteristic frequency of the first diaphragm 61 and the second diaphragm 64.

Nineteenth Embodiment

Figure 20:
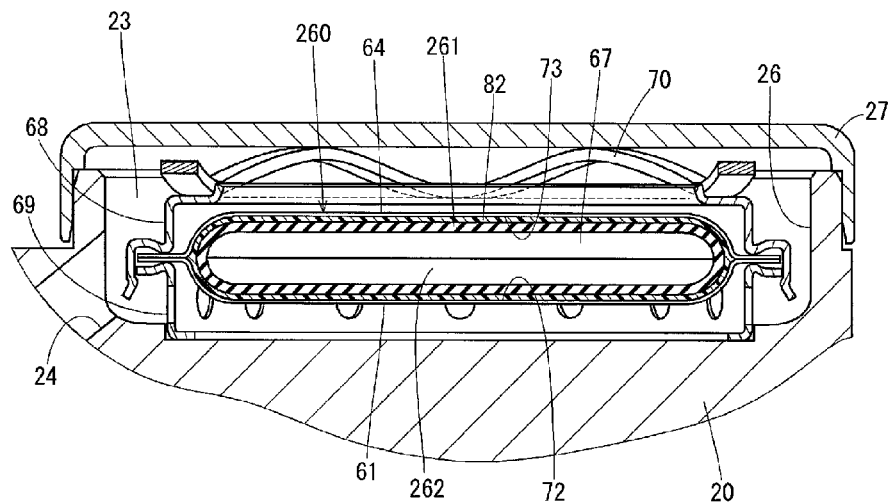
FIG. 20 is a cross-sectional view showing a pulsation damper of a high-pressure pump according to a nineteenth embodiment.

FIG. 20 is a cross-sectional view showing a pulsation damper of a high-pressure pump according to a nineteenth embodiment. An elastic member 261 of the pulsation damper 260 is a sheet member which is bonded to entire inner surfaces 72, 73 of the first and the second diaphragm 61, 64. The elastic member 261 defines a space 262 between the first and the second diaphragm 61, 64. The nineteenth embodiment has the same advantageous effect as the eighteenth embodiment. The resonance of the first diaphragm 61 and the second diaphragm 64 is surely restricted.

Twentieth Embodiment

Figure 21:
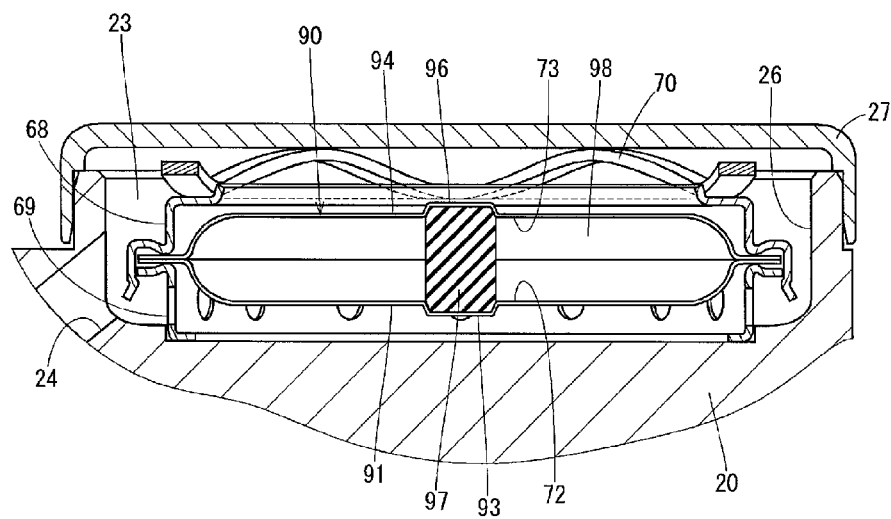
FIG. 21 is a cross-sectional view showing a pulsation damper of a high-pressure pump according to a twentieth embodiment.

FIG. 21 is a cross-sectional view showing a pulsation damper of a high-pressure pump according to a twentieth embodiment. A pulsation damper 90 is comprised of a first diaphragm 91 and a second diaphragm 94. The first diaphragm 91 has a first concave portion 93 at its center. The second diaphragm 94 has a second concave portion 96 at its center. An elastic member 97 is sandwiched between the first concave portion 93 and the second concave portion 96. The first concave portion 93 corresponds to a "first holding portion" and the second concave portion 96 corresponds to a "second holding portion". According to the twentieth embodiment, when the first diaphragm 91 and the second diaphragm 94 are engaged with each other, the elastic member 97 is easily positioned at a proper position.

Twenty-First Embodiment

Figure 22:
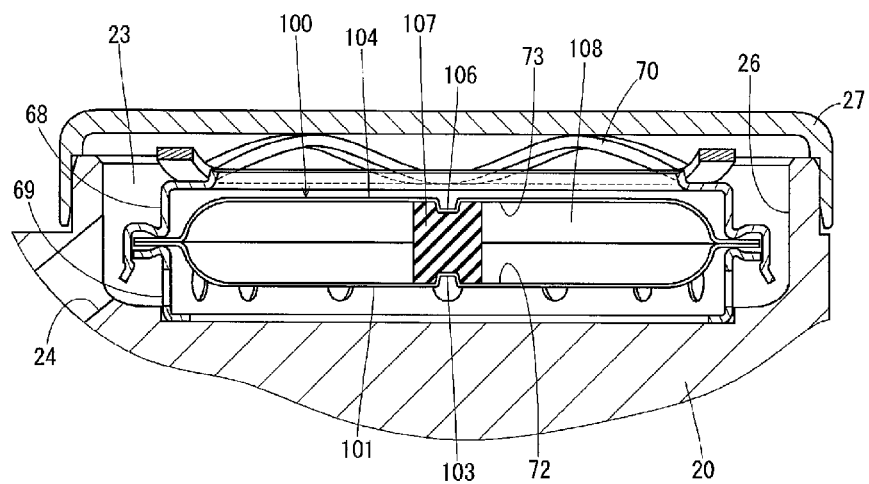
FIG. 22 is a cross-sectional view showing a pulsation damper of a high-pressure pump according to a twenty-first embodiment.

FIG. 22 is a cross-sectional view showing a pulsation damper of a high-pressure pump according to a twenty-first embodiment. A pulsation damper 100 is comprised of a first diaphragm 101 and a second diaphragm 104. The first diaphragm 101 has a first convex portion 103 at its center. The second diaphragm 104 has a second convex portion 106 at its center. An elastic member 107 is sandwiched between the first convex portion 103 and the second convex portion 106. The first convex portion 103 corresponds to a "first holding portion" and the second convex portion 106 corresponds to a "second holding portion". According to the twenty-first embodiment, the elastic member 97 is surely positioned at a proper position in a damper chamber 108.

Twenty-Second Embodiment

Figure 23:
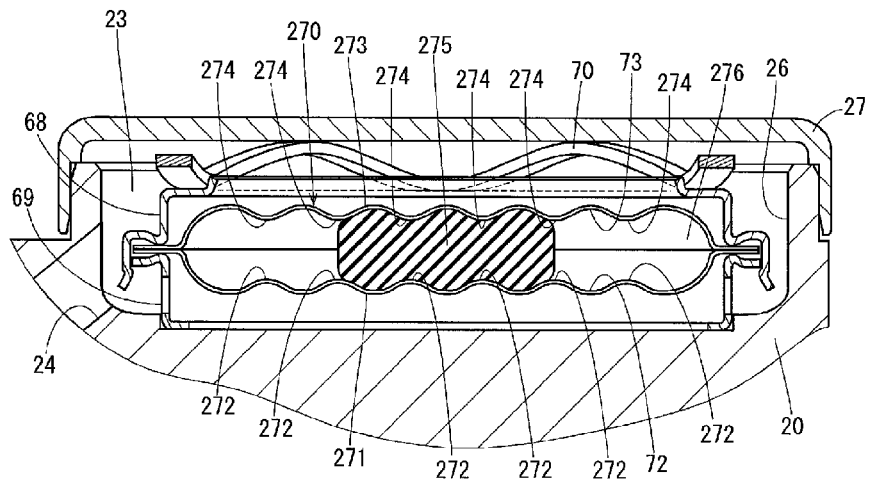
FIG. 23 is a cross-sectional view showing a pulsation damper of a high-pressure pump according to a twenty-second embodiment.

FIG. 23 is a cross-sectional view showing a pulsation damper of a high-pressure pump according to a twenty-second embodiment. A pulsation damper 270 is comprised of a first diaphragm 271 and a second diaphragm 273. The first diaphragm 271 is shaped like a wave having a plurality of convex portions 272 Also, the second diaphragm 273 is shaped like a wave having a plurality of convex portions 274. An elastic member 275 is sandwiched between the first convex portions 272 and the second convex portions 274. The first convex portions 272 correspond to a "first holding portion" and the second convex portions 274 correspond to a "second holding portion". According to the twenty-second embodiment, the elastic member 275 is surely positioned at a proper position in a damper chamber 276.

Twenty-Third Embodiment

Figure 24:
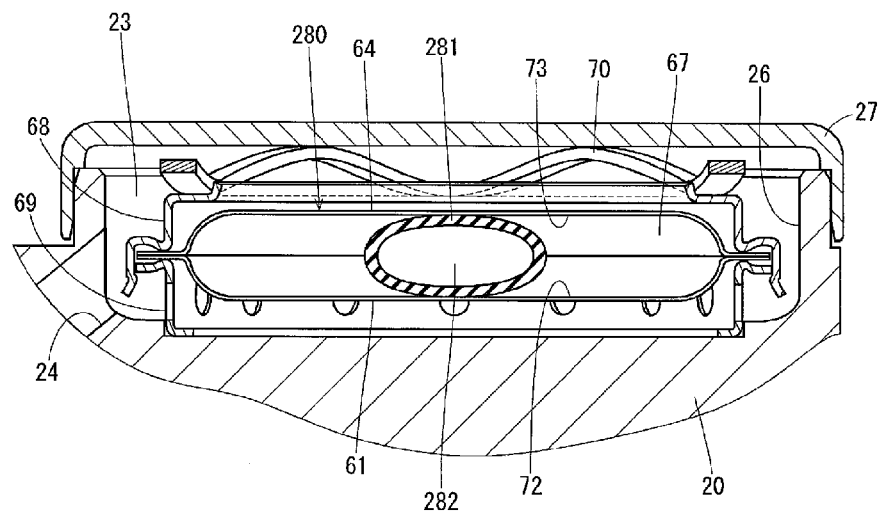
FIG. 24 is a cross-sectional view showing a pulsation damper of a high-pressure pump according to a twenty-third embodiment.

FIG. 24 is a cross-sectional view showing a pulsation damper of a high-pressure pump according to a twenty-third embodiment. An elastic member 281 of a pulsation damper 280 is a sphere and has a sealed space 282 isolated from the damper chamber 67 therein. The elastic member 281 is sandwiched between the first diaphragm 61 and the second diaphragm 64. In present embodiment, the inert gas is not enclosed in the damper chamber 67, but is enclosed in the sealed space 282. According to a twenty-third embodiment, it is unnecessary that the first diaphragm 61 and the second diaphragm 64 are joined together in inert gas. Therefore, the first diaphragm 61 and the second diaphragm 64 can be joined easily.

Twenty-Fourth Embodiment

Figure 25:
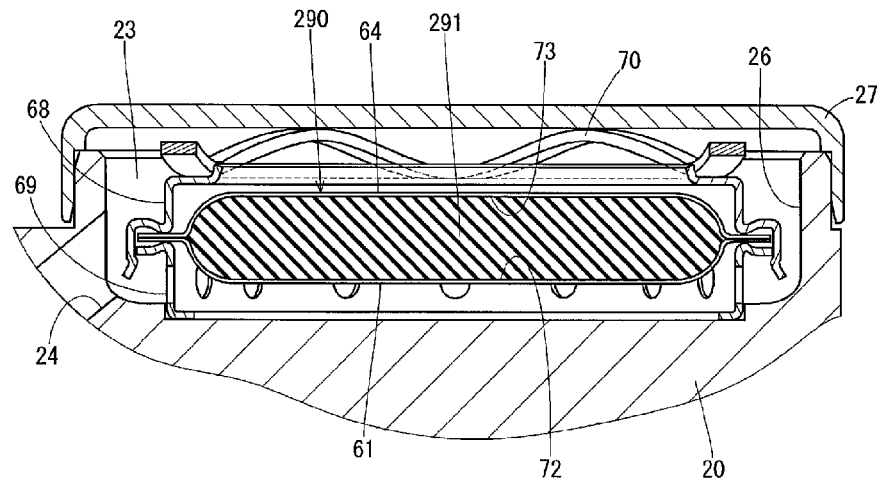
FIG. 25 is a cross-sectional view showing a pulsation damper of a high-pressure pump according to a twenty-fourth embodiment.

FIG. 25 is a cross-sectional view showing a pulsation damper of a high-pressure pump according to a twenty-fourth embodiment. An elastic member 291 of a pulsation damper 290 is a solidified rubber which fills a space between the first diaphragm 61 and the second diaphragm 64. According to the second embodiment, the resonance of the first diaphragm 61 and the second diaphragm 64 is further restricted. Further, it is unnecessary that the first diaphragm 61 and the second diaphragm 64 are joined together in inert gas.

Other Embodiment

The elastic member may be made of resin material. Also, the elastic member may be comprised of a coil spring or a flat spring. The elastic member may be arranged at a position other than the center of the diaphragm.

The elastic member may be bonded to only one of the diaphragms. In a case that the elastic members are arranged in a circumferential direction, it is not always necessary to arrange the elastic members at regular intervals.

The first diaphragm may have a convex portion and the second diaphragm may have a concave portion to sandwich the elastic member. Alternatively, the first diaphragm may have a concave portion and the second diaphragm may have a convex portion.

The pulsation damper may be fixed on the housing directly. The present disclosure is not limited to the embodiment mentioned above, and can be applied to various embodiments.

What is claimed is:
1. A pulsation damper, comprising:
a first diaphragm;
a second diaphragm arranged in the fuel chamber to define a damper chamber in cooperation with the first diaphragm, the damper chamber being isolated from the fuel chamber; and
an elastic member fixed in the damper chamber in such a manner as to be in contact with both the first diaphragm and the second diaphragm; wherein:
the elastic member has a rigidity-reducing portion for reducing a rigidity of the elastic member; and
the elastic member has
a first contact portion being in contact with the first diaphragm;

a second contact portion being in contact with the second diaphragm; and a first connecting portion connecting the first contact portion and the second contact portion as the rigidity-reducing portion.

2. A pulsation damper according to claim 1, wherein:
the first connecting portion connects a center portion of the first contact portion and a center portion of the second contact portion.

3. A pulsation damper according to claim 1, wherein:
the first connecting portion connects an end portion of the first contact portion and an end portion of the second contact portion.

4. A pulsation damper, comprising:
a first diaphragm;
a second diaphragm arranged in the fuel chamber to define a damper chamber in cooperation with the first diaphragm, the damper chamber being isolated from the fuel chamber; and
an elastic member fixed in the damper chamber in such a manner as to be in contact with both the first diaphragm and the second diaphragm; wherein:
the elastic member has a rigidity-reducing portion for reducing a rigidity of the elastic member; and
the elastic member has a through hole which extends in a deformation direction of the elastic member and functions as the rigidity-reducing portion.

5. A pulsation damper, comprising:
a first diaphragm;
a second diaphragm arranged in the fuel chamber to define a damper chamber in cooperation with the first diaphragm, the damper chamber being isolated from the fuel chamber; and
an elastic member fixed in the damper chamber in such a manner as to be in contact with both the first diaphragm and the second diaphragm; wherein:
the elastic member has a rigidity-reducing portion for reducing a rigidity of the elastic member; and
the elastic member has
a first contact portion being in contact with the first diaphragm;
a second contact portion being in contact with the second diaphragm; and
a second connecting portion made from a material softer than that of the first contact portion and the second contact portion, and connecting the first contact portion and the second contact portion as the rigidity-reducing portion.

6. A pulsation damper, comprising:
a first diaphragm;
a second diaphragm arranged in the fuel chamber to define a damper chamber in cooperation with the first diaphragm, the damper chamber being isolated from the fuel chamber; and
an elastic member fixed in the damper chamber in such a manner as to be in contact with both the first diaphragm and the second diaphragm; wherein:
the elastic member has a rigidity-reducing portion for reducing a rigidity of the elastic member; and
the elastic member has
a first contact portion being in contact with the first diaphragm;
a second contact portion being in contact with the second diaphragm; and
a spring portion arranged between the first contact portion and the second contact portion.

7. A pulsation damper, comprising:
a first diaphragm;
a second diaphragm arranged in the fuel chamber to define a damper chamber in cooperation with the first diaphragm, the damper chamber being isolated from the fuel chamber; and
an elastic member fixed in the damper chamber in such a manner as to be in contact with both the first diaphragm and the second diaphragm; wherein:
the elastic member has a first contact portion bonded to the first diaphragm and a second contact portion bonded to the second diaphragm; and
the first contact portion and the second contact portion define a space therebetween.

8. A pulsation damper, comprising:
a first diaphragm;
a second diaphragm arranged in the fuel chamber to define a damper chamber in cooperation with the first diaphragm, the damper chamber being isolated from the fuel chamber; and
an elastic member fixed in the damper chamber in such a manner as to be in contact with both the first diaphragm and the second diaphragm; wherein:
the elastic member has a sealed space which is isolated from the dumper chamber.

9. A pulsation damper, comprising:
a first diaphragm;
a second diaphragm arranged in the fuel chamber to define a damper chamber in cooperation with the first diaphragm, the damper chamber being isolated from the fuel chamber; and
an elastic member fixed in the damper chamber in such a manner as to be in contact with both the first diaphragm and the second diaphragm; wherein:
the elastic member has
a first contact portion being in contact with the first diaphragm;
a second contact portion being in contact with the second diaphragm; and
a space being defined between the first contact portion and the second contact portion.

10. A pulsation damper according to claim 9, wherein:
the space is arranged between a center portion of the first diaphragm and a center portion of the second diaphragm.

11. A pulsation damper, comprising:
a first diaphragm;
a second diaphragm arranged in the fuel chamber to define a damper chamber in cooperation with the first diaphragm, the damper chamber being isolated from the fuel chamber; and
an elastic member fixed in the damper chamber in such a manner as to be in contact with both the first diaphragm and the second diaphragm; wherein:
the elastic member has
a first contact portion being in contact with the first diaphragm;
a second contact portion being in contact with the second diaphragm; and
an elastic portion capable of being in contact with the first contact portion and the second contact portion; and
a cross sectional of the elastic portion is smaller than those of the first contact portion and the second contact portion in an orthogonal direction to a deformation direction of the elastic member.

* * * * *